United States Patent
Wilhelm et al.

(10) Patent No.: US 12,546,740 B2
(45) Date of Patent: Feb. 10, 2026

(54) SENSOR FOR MEASURING A PH VALUE

(71) Applicant: Endress+Hauser Conducta GmbH+Co. KG, Gerlingen (DE)

(72) Inventors: Thomas Wilhelm, Chemnitz (DE); Andreas Löbbert, Waldheim (DE); Matthäus Speck, Göpfersdorf (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 715 days.

(21) Appl. No.: 18/047,833

(22) Filed: Oct. 19, 2022

(65) Prior Publication Data
US 2023/0118150 A1 Apr. 20, 2023

(30) Foreign Application Priority Data
Oct. 20, 2021 (DE) ............ 10 2021 127 227.0

(51) Int. Cl.
*G01N 27/30* (2006.01)
*G01N 27/416* (2006.01)

(52) U.S. Cl.
CPC ......... *G01N 27/305* (2013.01); *G01N 27/302* (2013.01); *G01N 27/4167* (2013.01)

(58) Field of Classification Search
CPC . G01N 27/302; G01N 27/305; G01N 27/4167
See application file for complete search history.

(56) References Cited

U.S. PATENT DOCUMENTS

| | | | | |
|---|---|---|---|---|
| 2011/0108739 A1* | 5/2011 | Hanko | .......... | G01N 21/80 |
| | | | | 356/432 |
| 2014/0330100 A1* | 11/2014 | Li | .......... | B82Y 40/00 |
| | | | | 977/750 |
| 2017/0322172 A1* | 11/2017 | Hutton | .......... | G01N 27/302 |

FOREIGN PATENT DOCUMENTS

| | | | |
|---|---|---|---|
| DE | 19842735 A1 | 3/2000 | |
| GB | 2489106 A | 9/2012 | |
| GB | 2491005 A | 11/2012 | |
| WO | WO-2015000769 A1 * | 1/2015 | ........ G01N 27/308 |

* cited by examiner

*Primary Examiner* — Judy Nguyen
*Assistant Examiner* — Adam S Clarke
(74) *Attorney, Agent, or Firm* — Christopher R. Powers; Endress+Hauser (USA) Holding, Inc.

(57) ABSTRACT

A sensor for measuring a pH value of a measuring liquid includes: a sensor element including a surface adapted to the measuring liquid; a radiation source configured to emit electromagnetic transmission radiation to the sensor element, wherein at least a portion of the transmission radiation is converted into measurement radiation by reflection and/or scattering in a region of the surface; a radiation receiver configured to receive the measurement radiation and convert it into electrical signals; and a measuring circuit configured to determine the pH value from signals, wherein a wavelength of at least a portion of the transmission radiation generates charge carriers in at least a surface region or a near-surface region of the surface of the sensor element as to effect a photoelectrochemical reaction with formation of hydrogen at the surface.

23 Claims, 3 Drawing Sheets

SENSOR FOR MEASURING A PH VALUE

The present application is related to and claims the priority benefit of German Patent Application No. 10 2021 127 227.0, filed on Oct. 20, 2021, the entire contents of which are incorporated herein by reference.

TECHNICAL FIELD

The present disclosure relates to a sensor for measuring a pH value of a measuring liquid.

BACKGROUND

The measurement of the pH value of a measuring liquid plays a major role in the laboratory, in environment analysis, and in process measurement technology. Most predominantly, potentiometric sensors having a pH-sensitive measuring half-cell and a potential-stable reference half-cell are used for the pH measurement. A glass electrode having a membrane made of pH-selective glass is suitable as a pH-sensitive measuring half-cell. Although such potentiometric pH sensors provide very accurate measurement results, they are relatively susceptible to faults and are maintenance-intensive. Typical faults of potentiometric sensors having conventional glass electrodes include mechanical damage or chemical aging of the glass membrane.

As mechanically more stable and in principle less maintenance-intensive pH sensors, pH-ISFET sensors or potentiometric sensors having a pH-sensitive enamel electrode as a measuring half-cell are also used, in particular in the process industry. However, the semiconductor chips used in ISFET sensors are not continuously stable at high temperatures, and in particular at high pH values. Although enamel electrodes are mechanically robust, conventional enamel electrodes have a lower measurement accuracy than conventional pH sensors having a glass electrode. Currently available enamel or ISFET sensors are thus less universally employable than pH sensors having a pH glass electrode.

All such electrochemical sensors also require a reference electrode. As a reference electrode, a silver/silver chloride electrode is generally used. These electrodes usually have a housing in which are contained a reference electrolyte having a high chloride concentration and a reference element contacting the reference electrolyte. The reference element is often formed from a silver wire having a coating of silver chloride. During measuring operation of the sensor, the reference electrolyte is in electrolytic contact with the measuring liquid via a transfer, e.g., a diaphragm, arranged in the housing wall. Via the transfer, undesired electrode poisons can penetrate into the reference electrode, and/or chloride can escape to an undesirably high degree from the reference electrolyte into the measuring liquid, which can lead to a drift of the reference potential. The transfer itself is susceptible to faults, e.g., it can become clogged during operation, which also leads to corruption of measurement results.

In many areas, these sensors can nevertheless be used over relatively long periods of time by performing regular maintenance and/or calibration in order to eliminate any faults that may arise, and/or to compensate for aging-related sensor drift. However, such regular maintenance and/or calibration causes labor expenses and other costs.

There have therefore been efforts for a relatively long time to provide pH sensors based upon an optical measuring principle instead of an electrochemical measuring principle. Normally, optical sensors have a lower susceptibility to faults, and thus a maintenance-free operation over a longer time.

Heretofore, primarily optical sensors have become known which perform measurements of an analyte concentration on the basis of so-called luminescence quenching, e.g., fluorescence quenching. Such sensors usually comprise a measuring element having an indicator dye, e.g., a membrane, in which molecules of an indicator dye are immobilized. The indicator dye is selected such that it can be excited to emit luminescence radiation, wherein the luminescence of the indicator dye is extinguished by interaction with the analyte—in the case of the pH measurement, for example, with the hydronium ion. The intensity, the decay time, or a phase shift of the luminescence radiation are thus a measure of the analyte concentration.

Disadvantages of previously known optical ion and pH sensors are their slow response time, only limited suitability for uses at high temperatures, a temperature and/or ionic strength dependence of the sensor signal that cannot be compensated for or can be compensated for only with difficulty, a systematic sensor drift due to leaching/bleaching of the indicator dye contained in the sensor membrane, and the frequently complex synthesis of the indicator molecules. Previous systems therefore have not met the expectations relating to long, maintenance-free operating times.

SUMMARY

It is therefore the object of the present disclosure to specify an improved sensor, based upon an optical measuring principle, for measuring the pH value of a measuring liquid. In particular, the sensor is to avoid the aforementioned disadvantages of the known optical pH sensors known from the prior art that are based upon the principle of luminescence quenching.

The aim is achieved by a sensor for pH measurement according to the present disclosure, including its various advantageous embodiments.

A sensor according to the present disclosure for measuring a pH value of a measuring liquid comprises:

a sensor element having a surface intended for contact with the measuring liquid;

at least one radiation source, which is configured to emit electromagnetic transmission radiation that reaches the sensor element, wherein at least a portion of the transmission radiation is converted into measurement radiation by reflection and/or scattering in the region of the surface;

at least one radiation receiver configured to receive the measurement radiation and convert it into electrical signals; and a measuring circuit connected to the radiation receiver, which circuit is configured to determine a measured value representing the pH value of the measuring liquid from signals of the radiation receiver, wherein the wavelength of at least a portion of the transmission radiation is suitable for generating charge carriers in at least a surface region or a near-surface region of the surface, intended for contact with the measuring liquid, of the sensor element, in order to bring about a photoelectrochemical reaction with formation of hydrogen at the surface intended for contact with the measuring liquid.

In an advantageous embodiment, the sensor element can be exchangeable. For example, it can be designed in the form of an exchangeable cap, which can be detachably refastened to a probe housing of the sensor.

By generating charge carriers in a surface region or near-surface region of the sensor element, hydroxide ions present in a photoelectrochemical process can be oxidized at the interface with the measuring liquid, or oxonium ions (also referred to as hydronium ions) or protons adsorbed on the surface can be reduced in order to produce elemental and/or molecular hydrogen. Depending upon the nature of the surface of the sensor element, the hydrogen produced can be reversibly accumulated or depleted on the surface or in a region close to the surface, for example, by adsorption, chemical bonding, or solution in the region close to the surface. The amount of hydrogen produced depends upon the pH value present in the measuring liquid; accordingly, the accumulation or depletion of hydrogen on the surface or in the near-surface region of the sensor element is a measure of pH value changes in the measuring liquid.

The atomic or molecular hydrogen present on the surface or in the region close to the surface can be detected by means of reflection and/or scattered light measurement, for example, Raman spectroscopy. The intensity of the measurement radiation scattered or reflected on the surface or in the region close to the surface is therefore a quantitative measure of the atomic or molecular hydrogen formed, and thus also of the pH value prevailing in the measuring liquid. Accordingly, the electrical signal generated by the radiation receiver represents the current pH measured value of the measuring liquid.

The surface region can comprise a metal or a metal alloy which binds the atomic hydrogen and/or molecular hydrogen, in particular to form a metal hydride. The metal or the metal alloy can comprise a platinum metal, for example. Metallic hydrogenation catalysts or metallic hydrogen accumulators are options as the suitable metal or as suitable metal alloy, for example, Pt, Pd.

For example, the metal or metal alloy may comprise at least one element of the group 8-10 (VIIIB) or the group 11 (IB) of the periodic table of the elements.

The sensor element can have a first top layer made of the metal or the metal alloy and a second layer arranged, in particular directly, below the first layer, wherein the first layer forms the surface intended for contact with the measuring liquid, and wherein the second layer is formed of a semiconductor material. The second layer can be electrically conductively connected to ground, and in some cases via a further electrically-conductive layer arranged below the second layer.

The semiconductor material may have a doping. It can be selected, for example, from metal oxides, in particular $d^0$- or $d^{10}$-metal oxides, complex metal oxides, perovskites, Si, Ge, III/IV or II/VI semiconductors, intrinsically or doped, e.g., n-$TiO_2$, n-ZnO, n-$SrTiO_3$, n-$WO_3$, n-CdS, n-$BiVO_4$, n-$Fe_2O_3$, n-$Ta_3N_4$, n-CdSe, p-GaP, p-$CuO_2$, p-GaAs, p-InP, and p-Si.

Between the first and the second layers, i.e., between the top layer formed from the metal or the metal alloy and the underlying layer made of the semiconductor material, a third layer of the semiconductor material can be arranged with a different doping than the second layer or made of a second semiconductor material. The second layer can have a doping, and the semiconductor material of the third layer can also have a doping, such that a p-n junction is formed between the second and the third layers. The p-n junction serves to separate generated free charge carriers from one another, so that, at the interface with the measuring liquid, more electrons or holes are available for a redox reaction with oxonium ions or hydroxide ions. The p-n junction or the third layer can be designed to be very thin. It can be produced by introducing a doping into a surface of the second layer. Alternatively, the third layer may be produced by sputtering or vapor deposition on the surface of the second layer.

In another embodiment, the semiconductor material of the second layer can have a doping, and a third layer formed of a doped semiconductor material can be arranged on the side, facing away from the first layer, of the second layer, such that a p-n junction is formed between the second and the third layers.

In a further embodiment, the sensor element may comprise a plurality of, in particular doped, semiconductor nanoparticles, in particular quantum dots, wherein the semiconductor nanoparticles are at least partially surrounded by the metal or the metal alloy.

In a further embodiment, the semiconductor nanoparticles can each form the core of a core-shell structure, wherein the shell is formed from the metal or the metal alloy.

The semiconductor nanoparticles may be designed as nanorods having a first end and a second end opposite the first end, wherein a portion of the nanorods comprising the first end is encased in a first layer made of the metal or metal alloy, and the second end is covered by a second layer made of a doped semiconductor such that a p-n junction is formed between the second end of the nanorods and the second layer.

The sensor element may comprise at least first semiconductor nanostructures and second semiconductor nanostructures, each of which is at least partially covered by a layer made of the metal or metal alloy in such a way that the layer made of the metal or the metal alloy forms the surface, intended for contact with the measuring liquid, of the sensor element, and wherein the first semiconductor nanostructures have a different geometry and/or chemical composition and a different bandgap than the second semiconductor nanostructures. This allows the generation of charge carriers having a larger bandwidth of wavelengths of the radiation source, so that, overall, a higher yield and a broader energetic spectrum of charge carriers can be achieved.

The at least one radiation source can be configured to emit transmission radiation of at least one wavelength. For example, the radiation source can be configured to emit transmission radiation of different wavelengths. If the sensor element has first and second nanostructures with different band gaps, as described above, free charge carriers can be generated in the first semiconductor nanostructures by absorption of the radiation of a first wavelength emitted by the radiation source, and free charge carriers can be generated in the second semiconductor nanostructures of the sensor element by absorption of the radiation of a second wavelength emitted by the radiation source which is different from the first wavelength. The radiation of the first or second wavelength can be emitted, for example, simultaneously or alternately, e.g., pulsed.

In a further embodiment, the sensor element can have a first, top layer formed from the metal or the metal alloy, and a second layer arranged, in particular directly, below the first layer, wherein the second layer has individual regions, having at least one, in particular doped, semiconductor material, which are electrically insulated from one another by regions formed from an electrically-insulating material. The individual regions comprising the semiconductor material form quantum dots which can behave similarly to the aforementioned nanoparticles: By absorption of electromagnetic radiation, free charge carriers, which are available for the reduction of oxonium ions or for the oxidation of hydroxide ions in the measuring liquid, can be formed in the quantum dots.

In this embodiment, the regions having the semiconductor material can each have a first partial layer, directly adjoining the first layer, made of a first doped semiconductor material and a second partial layer, made of a second doped semiconductor, arranged on the side, facing away from the first layer, of the first partial layer, such that a p-n junction is formed between the first partial layer and the second partial layer.

The quantum dots formed by nanoparticles or by regions, having semiconductor material, in the second layer of the sensor element can have an average size (diameter in the region of the longest extension) of 2 to 50 nm. In the case of nanoparticles which are formed as core-shell structures, i.e., that have a core region made of a semiconductor material and a metallic sheath, an average size of 2 to 50 nm for the core region is advantageous.

The surface of the sensor element can have a plurality of metallic nanostructures or nanoparticles, which serve to strengthen Raman scattering by molecules adsorbed on the surface, in particular hydrogen molecules. The nanostructures can be formed by roughening the aforementioned top layer made of metal or of a metal alloy that is present on the surface of the sensor element. Alternatively, the top layer of the sensor element can be formed by a plurality of nanoparticles formed of metal or of the metal alloy. The metallic structures or nanoparticles advantageously have a size (diameter in the region of the longest extension) of less than 1,000 nm, preferably 10 to 100 nm, and more preferably 25 to 50 nm.

Advantageously, the metallic nanoparticles or nanostructures, or else the aforementioned quantum dots, are clustered such that a proportion of more than half of the distances present between the individual structures or particles is less than 20 nm, preferably 1 to 10 nm, and more preferably between 1 and 5 nm.

In order to increase the yield of free charge carriers in the semiconductor material of the sensor element, a further embodiment can be advantageous in which the sensor element in the surface region has a photosensitizer for the formation of electron hole pairs in semiconductors, the band gaps of which are too large for a direct excitation, i.e., for generating the charge carriers, with the transmission radiation. For example, when titanium dioxide is used as semiconductor material, such an additional photosensitizer arranged on the surface of the sensor element can be advantageous. Photosensitizers include, for example, metal porphyrins, metal phthalocyanines, BODIPY, thiazines, phenazines, xanthenes, acridines, or triphenylmethyl compounds.

In an advantageous embodiment, the sensor element can have a top first layer, comprising the metal or the metal alloy, and a coating which is arranged below the first layer and is transparent at least to a part of the transmission radiation and/or at least to a part of the measurement radiation, said layer being formed from an electrically-conductive material. The transparent coating can be formed from a transparent, conductive oxide, for example, AZO, FTO, ITO.

The sensor can further comprise an auxiliary electrode, intended for contact with the measuring liquid, and a voltage source which is configured to apply a voltage between the transparent coating and the auxiliary electrode. The auxiliary electrode can be formed, for example, by a housing part of the sensor. The voltage can be dimensioned such that hydronium ions, when they come into contact with the measuring liquid, are reduced to hydrogen at the surface, intended for contact with the measuring liquid, of the sensor element. This embodiment is particularly advantageous if the band gap of the semiconductor material is too large for a direct excitation with the transmission radiation.

The at least one radiation receiver can be configured to receive at least a portion of the transmission radiation reflected and/or scattered in the region of the first surface, in particular at the first surface, as measurement radiation and convert it into electrical signals.

The at least one radiation receiver can be configured to receive converted transmission radiation as measurement radiation and convert it into electrical signals by Raman scattering in the region of the first surface, in particular in a first coating of the sensor element contacting the measuring liquid.

In a further advantageous embodiment, the sensor element can have a first, top layer formed from the metal or the metal alloy, and a second layer arranged, in particular directly, below the first layer, wherein the second layer consists of an optically switchable material (e.g., a Mg—Ti alloy) which can be switched between transparent and reflective. This embodiment enables sensor self-referencing, a sensor adjustment, e.g., an in-situ adjustment of the sensor, or a functional check of the sensor, by using the transmission radiation, reflected, in the case of material switched to be reflective, on the second layer, as a reference signal.

BRIEF DESCRIPTION OF THE DRAWINGS

The present disclosure is described in more detail in the following with reference to the exemplary embodiments illustrated in the figures. Identical reference signs denote the same components of the sensor. The following are shown.

DETAILED DESCRIPTION

Figure 1:
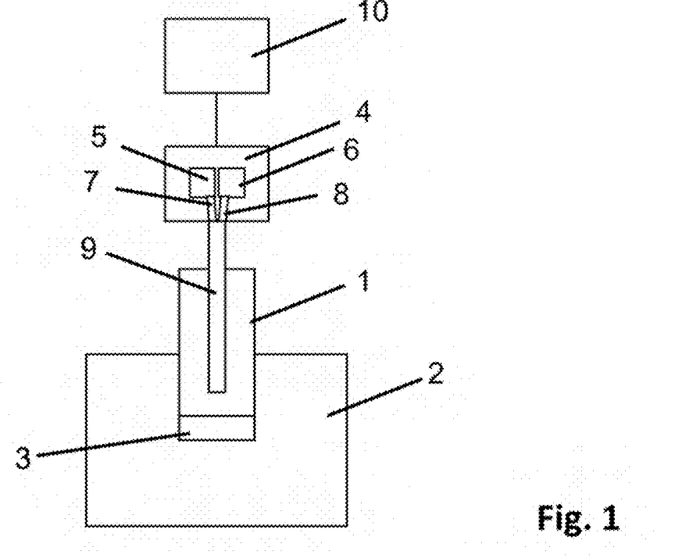
FIG. 1 shows a schematic representation of a sensor for measuring a pH value in a measuring liquid according to a first exemplary embodiment.

FIG. 1 schematically shows the structure of a sensor for optically measuring a pH value in a measuring liquid according to a first exemplary embodiment. The sensor has a probe body 1, on the front end region of which a sensor element 3 intended for contact with the measuring liquid 2 is arranged.

The sensor also has an optical unit 4, which comprises at least one radiation source 5 and at least one radiation receiver 6. The radiation source 5 can be designed to emit electromagnetic radiation of one or more wavelengths. For example, the radiation emitted by the radiation source 5, also referred to as transmission radiation, can comprise several discrete wavelengths or one or more broader wavelength range(s). The radiation source 5 can comprise one or more LED's and/or one or more lamps and/or one or more lasers or laser diodes. The wavelength(s) of the radiation emitted by the radiation source 5 can be in the visible spectral range and/or in the near-ultraviolet range. In the present example, electromagnetic transmission radiation emitted by the radiation source 5 is conducted to the sensor element 3 via at least one light guide 7. Between the radiation receiver 6 and the sensor element 3 there is likewise a light guide 8, via which radiation converted at the sensor element 3, e.g., by reflection and/or scattering—such radiation also referred to as measurement radiation—reaches the radiation receiver 6. In the present example, the light guide 7 and the light guide 8 each comprise a bundle of optical fibers which are combined into a fiber bundle 9. The fiber bundle 9 is guided in the probe body 1 towards the rear side of the sensor element 3.

The radiation receiver 6 is designed to receive the received measurement radiation that is converted on the sensor element 3 and convert it into electrical signals. The radiation receiver 6 can, for example, comprise one or more photodiodes. In an advantageous embodiment, the radiation receiver can be a spectrometer which is configured to extract Raman signals from the received radiation and to detect them as a function of the wavelength or as a function of another variable that can be converted into the wavelength. For example, the spectrometer can detect an intensity profile of the received radiation as a function of the wavelength, from which intensity peaks caused by Stokes scattering or anti-Stokes scattering can be determined.

The radiation source 5 and/or the radiation receiver 6 can be accommodated together with the sensor element 3 within the same housing. However, it is also possible for the radiation source 5 and/or the radiation receiver 6 to be accommodated at least partially in a housing which is offset or set apart from the probe body 1.

The sensor further comprises sensor electronics 10. This can be accommodated at least partially in the probe body 1. Alternatively, it can be designed as a separate electronics module, e.g., in the form of a computer or measuring transducer, which is connected to the optical unit 4 and, if applicable, to an on-site electronics unit in the probe body 1, in order to receive electrical signals and/or digital data of the probe or of the optical unit 4 and/or to control the optical unit 4 and/or electrical components accommodated in the probe body 1. In a further alternative embodiment, at least a part of the sensor electronics 10 can be a component of the optical unit 4. It is possible in particular to design the sensor electronics 10 to be distributed among the probe body 1, the optical unit 4, and a separate electronics module.

In the present example, the sensor electronics 10 serves to control the radiation source 5 and to process the signals generated by the radiation receiver 6. To the extent that the radiation receiver 6 is configured to digitize and, when applicable, pre-process electrical signals, the sensor electronics 10 can serve for further processing of the data of the radiation receiver thus generated, e.g., spectral data, in order to determine therefrom measured values of the pH value.

Figure 2:
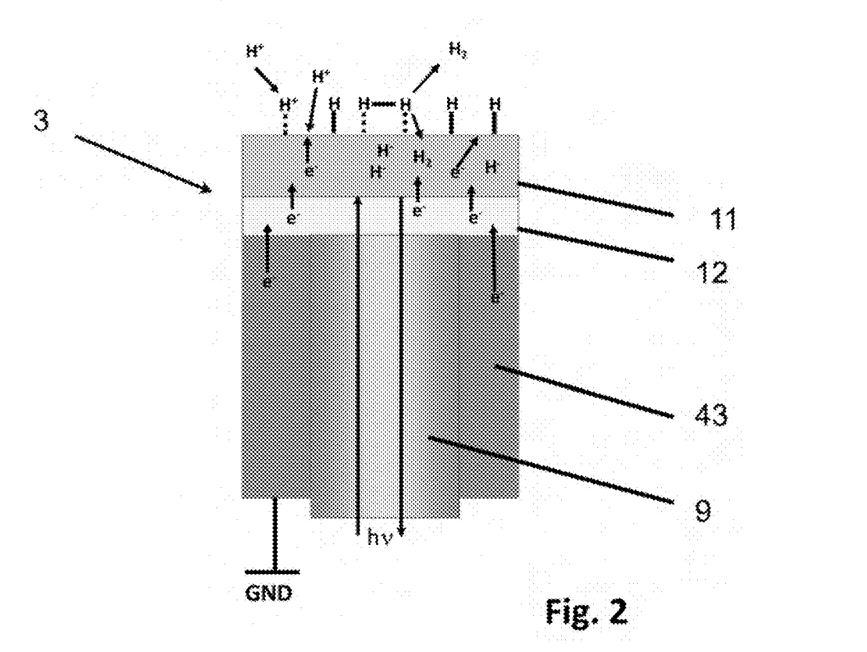
FIG. 2 shows a schematic longitudinal section view of the front end, intended for media contact, of the sensor shown in FIG. 1.

FIG. 2 shows a schematic longitudinal section view of the sensor element 3 of the sensor shown in FIG. 1. The sensor element 3 can be designed, for example, as a replaceable cap, which can be detachably reconnected to the probe body 1. In the exemplary embodiment shown here, the sensor element 3 has a first coating 11 which is intended for direct contact with the measuring liquid. As will be explained further below, it can be formed from several layers or also from individual layers, e.g., as a layer stack or in the form of nanostructures formed as core-shell structures. In the present example, the top layer, formed for contact with the measuring liquid, of the first coating 11 consists of palladium. The top layer provided for contact with the measuring liquid can also be formed from another metal or a metal alloy. Below the first coating 11, a further coating 12 made of a transparent, electrically-conductive oxide, e.g., of ITO (indium tin oxide), AZO (aluminum-doped zinc oxide) is arranged. ITO and AZO are n-type semiconductors. Alternatively, the transparent oxide can also be a p-type semiconductor, e.g., $CuAlO_2$ or $CuCrO_2$.

The sensor element 3 designed as a replaceable cap has a cylindrical wall 43 made of an electrically-conductive material, e.g., stainless steel, which is connected to ground (GND). The light guide 9, via which electromagnetic radiation is guided from the radiation source towards the coatings 11, 12, is guided through the cylindrical cap. Arranged in the surface region, in particular above or below the palladium layer of the first coating 11, is a photo catalyst, which, as a result of the radiation emitted by the radiation source 5, releases charge carriers, e.g., electrons or holes, which, on the surface of the sensor element 3, reduces hydronium ions of the measuring liquid or oxidizes hydroxide ions in such a way that, on the surface, elemental hydrogen, i.e., atomic or molecular hydrogen with the oxidation stage 0, is formed, which is bonded in the palladium layer. In this way, hydrogen accumulates or is depleted in the first coating 11 during irradiation by the radiation source 5. The amount or concentration of the hydrogen bonded to or in the first coating 11 is a measure of the pH value of the measuring liquid. The photocatalyst may be formed by a second layer of a doped semiconductor material. The wavelength of the irradiated radiation and the semiconductor material are matched to one another in such a way that, under irradiation, a charge carrier yield sufficient for the above-described photoelectrochemical reaction of hydronium or hydroxide ions is present. Additionally or alternatively, a photosensitizer, which further increases the charge carrier yield, can be provided in the surface region of the sensor element.

The amount or concentration of the hydrogen bonded to or in the first coating 11 can be measured in various ways with optical means. A reflection measurement is possible, for example, because the reflectivity of the palladium layer of the first coating 11 depends upon the hydrogen concentration present in the palladium layer. For reflection measurement, the radiation receiver 6 can detect radiation, reflected on the first coating 11, which is guided via the light guide 9 to the radiation receiver 6, and generate signals dependent upon the intensity thereof, which signals are further processed by the sensor electronics 10 for determining a pH value. For this purpose, calibration data, e.g., in the form of calibration functions or tables, can be stored in a memory of the sensor electronics 10, which data assign the intensity measurement values to pH values.

In an advantageous embodiment of the sensor, it is possible for radiation of one and the same wavelength or one and the same wavelength range to be used both for the generation of charge carriers for photoelectrochemical reaction of hydronium or hydroxide ions on the surface of the sensor element 3 and for the reflection measurements. Alternatively, however, it is also possible for the radiation source 5 to emit radiation of different wavelengths or different wavelength ranges, and, for generating charge carriers in the surface region of the sensor element 3, for a first wavelength or a first wavelength range to be radiated, and for a different second wavelength or a second wavelength range to be used for the reflection measurement.

In another embodiment of the sensor, a hydrogen concentration on the surface of the coating 11 or in the surface region of the sensor element can be determined by means of Raman spectroscopy. In this case, a Raman spectrum, i.e., a wavelength-dependent intensity distribution of measurement radiation of the radiation source 5 scattered inelastically by hydrogen or palladium hydride in the surface region of the sensor element 3, is detected by means of the radiation receiver, which is designed as a Raman spectrometer, and the intensity peaks of the spectrum evaluated quantitatively. For this purpose, calibration data stored in the sensor electronics 10 can also serve to assign corresponding pH measurement values to the detected intensities.

FIGS. 3*a*-3*d* schematically illustrate different possible embodiments of the first coating 11, which can be formed, in these embodiments, from several layers made of different materials.

Figure 3A:
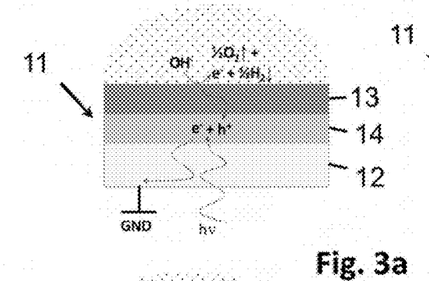
FIG. 3a shows a schematic longitudinal section view of a sensor element according to a first exemplary embodiment.

In FIG. 3*a*, the top coating 11 is formed from a top, first layer 13 and a second layer 14 arranged directly below it. In the present example, the first layer 13 consists of palladium or platinum, which are suitable for adsorbing, bonding, or releasing hydrogen formed on the surface in the measuring liquid. The second layer 14 consists of an n-type semiconductor material. The second coating 12 arranged under the first coating 11 consists of a transparent, electrically-conductive oxide such as ITO. In this exemplary embodiment, the wavelength of the excitation radiation irradiated by the radiation source 5 into the first coating 11 is selected such that electrons are excited from the valence band into the conduction band of the n-type semiconductor by absorption of the excitation radiation, and said electrons can flow out to ground via the conductive second coating. The holes h+ produced in the same way are available for the oxidation of the hydroxide ions on the surface of the sensor element 13.

Figure 3B:
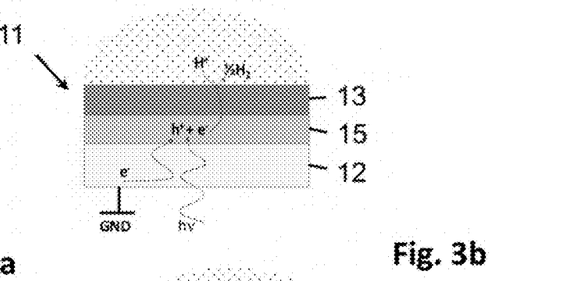
FIG. 3b shows a schematic longitudinal section view of a sensor element according to a second exemplary embodiment.

In FIG. 3*b*, the top coating 1 is formed from a top, first layer 13 and a second layer 15 arranged directly below it. The first layer 13 in turn consists of palladium or platinum. In this example, the second layer 15 consists of a p-type semiconductor material. The second coating 12 arranged under the first coating 11 consists of a transparent, electrically-conductive oxide. The wavelength of the excitation radiation irradiated by the radiation source 5 into the first coating 11 is selected such that electrons are lifted from the valence band into the conduction band of the semiconductor by absorption of the excitation radiation and pass via the electrically-conductive first layer 13 into the interface region for the measuring liquid in order to reduce hydronium ions that are present there to elemental hydrogen. The holes formed in the second layer 15 recombine with electrons from the underlying second coating 12.

Figure 3C:
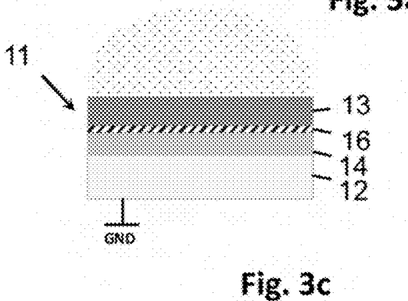
FIG. 3c shows a schematic longitudinal section view of a sensor element according to a third exemplary embodiment.
Figure 3D:
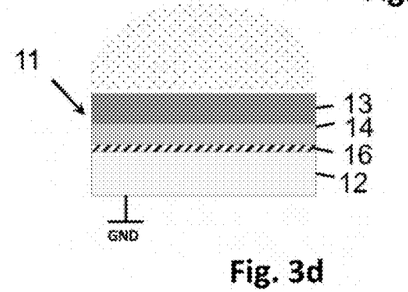
FIG. 3d shows a schematic longitudinal section view of a sensor element according to a fourth exemplary embodiment.

The first coating 11, intended for contact with the measuring liquid, of the sensor element shown in FIG. 3*c* is substantially similar in design to that of the exemplary embodiment described with reference to FIG. 3*a*. In addition, the coating 11 also has a p-n junction 16 between the first layer 13 made of palladium and the second layer 14 made of the n-type semiconductor material. Alternatively, the p-n junction 16 can also be arranged between the second layer 15 and the second coating 12 made of the electrically-conductive oxide. The p-n junction blocks the current flow in one direction, depending upon the doping of the layers above and below. Thus, the p-n junction increases the yield of charge carriers available at the interface of the top layer 13 for redox reactions.

Figure 4A:
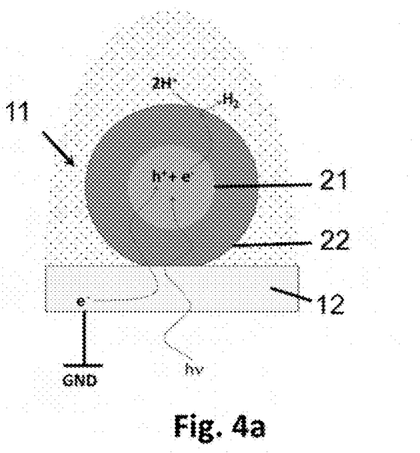
FIG. 4a shows a schematic longitudinal section view of a sensor element according to a fifth exemplary embodiment.
Figure 4B:
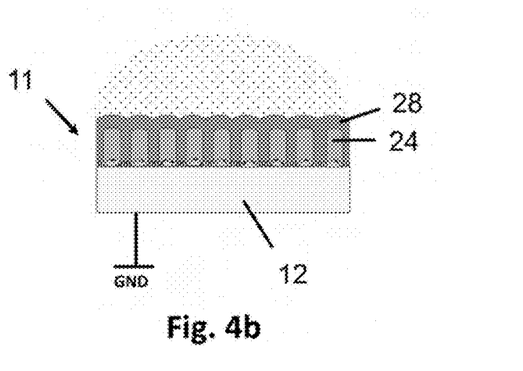
FIG. 4b shows a schematic longitudinal section view of a sensor element according to a sixth exemplary embodiment.
Figure 4C:
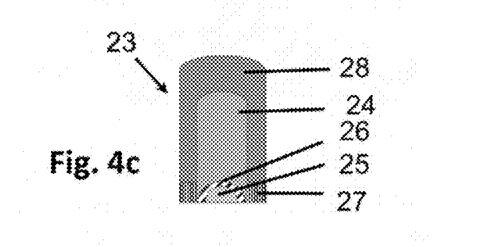
FIG. 4c shows a schematic view of a single nanoparticle of the sensor element according to the sixth exemplary embodiment.

FIGS. 4*a*-4*c* show further possible embodiments of the first coating 11 of the sensor element 3. In FIG. 4*a*, a coating 11 formed by nanoparticles is arranged on the underlying second coating 12, which, as in the previously described exemplary embodiments, can be made of an electrically-conductive, transparent oxide, which is electrically conductively connected to ground, for example, the housing of the probe body 1. A single nanoparticle is shown by way of example in FIG. 4*a*. It has a core-shell structure, wherein the core 21 is formed by a p-doped semiconductor material, and the shell 22 is formed by palladium or platinum. As in the layer stack structure previously described with reference to FIG. 3*b*, electrons are generated by the irradiated radiation of the radiation source, which electrons reduce the hydronium ions present on the shell of the nanoparticle to form hydrogen. By Raman spectroscopy, the accumulation or depletion of hydrogen on the coating 11 formed by the nanoparticles may be detected, in a manner quite analogous to that further described above, and a pH value determined therefrom.

Instead of conventional core-shell nanoparticles, other, more complex, nanostructures can also be used for the coating 11. In FIG. 4*b*, the coating 11 is formed by a plurality of nanorods 23. A single one of these nanorods 23 is shown in detail in FIG. 4*c*. The nanorods 23 have a rod-shaped core 24 made of an n-doped semiconductor material. As in the previously described exemplary embodiments, a second coating 12 made of a conductive, transparent oxide, e.g., ITO, is arranged below the first coating 11. The cores 24 of the nanorods 23 are each connected to the second coating 12 at their foot end via a region 25 made of a p-doped semiconductor material and a p-n junction 26 formed between the core 24 and the region 25. The cores 24 are covered by a layer 28 made of palladium or platinum. Insulating regions 27 made of an electrical insulator, e.g., quartz or quartz glass, which electrically insulate the layer 28 from the second coating 12, are arranged between the individual cores 24 of the nanorods 23.

Figure 5:
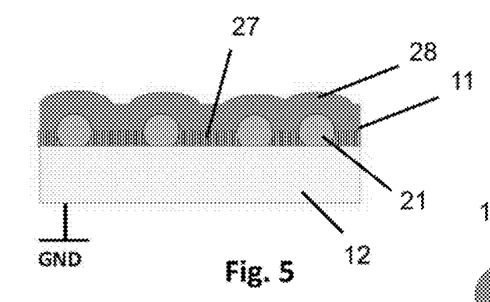
FIG. 5 shows a schematic longitudinal section view of a sensor element according to a seventh exemplary embodiment.

FIG. 5 shows a further possible embodiment of the first coating 11. Here, the coating 11 comprises a plurality of nanoparticles 21 made of a semiconductor material, e.g., a p-type or n-type semiconductor material, which are arranged directly on a second coating 12 made of a transparent, electrically-conductive oxide. The nanoparticles 21 are covered by a top layer 28 made of platinum or palladium. This layer 28 is insulated from the second coating by an insulating layer 27 made, for example, of an electrical insulator, e.g., quartz, quartz glass, or a polymer.

Figure 6A:
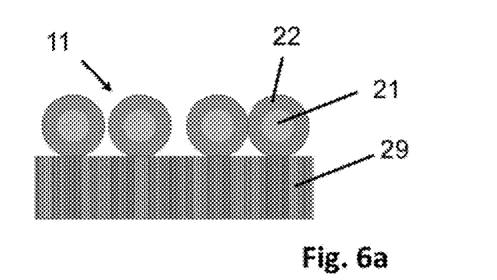
FIG. 6a shows a schematic longitudinal section view of a sensor element according to an eighth exemplary embodiment.
Figure 6B:
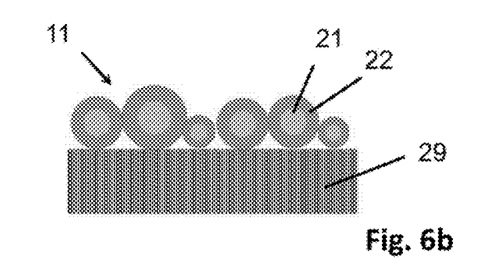
FIG. 6b shows a schematic longitudinal section view of a sensor element according to a ninth exemplary embodiment.

FIGS. 6a and 6b show further embodiments of the first coating 11. Here, the top, media-contacting coating 11 is formed from core-shell nanoparticles, wherein the core can be formed from an n-type or p-type semiconductor material, and the shell from a metal, for example, palladium or platinum. The second coating 29 arranged under the first coating 11 is formed here of either a transparent, conductive oxide or an insulating glass substrate. In the embodiment according to FIG. 6a, the nanoparticles have a substantially uniform size. In the embodiment according to FIG. 6b, nanoparticles of different sizes are present which have correspondingly different band gaps. This allows a higher yield of charge carriers for the photoelectrochemical reaction with hydronium or hydroxide ions in the measuring liquid when the irradiated excitation radiation is of various wavelengths which are each suitable for generating charge carriers in the nanoparticles of different sizes. Particularly advantageously, the excitation radiation of a broadband radiation source can be used here.

Figure 7A:
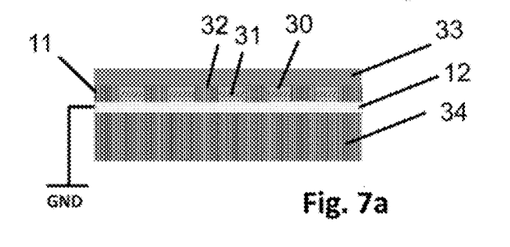
FIG. 7a shows a schematic longitudinal section view of a sensor element according to a tenth exemplary embodiment.
Figure 7B:
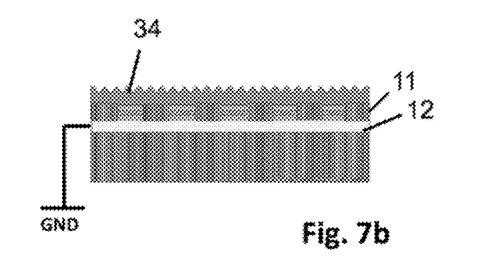
FIG. 7b shows a schematic longitudinal section view of a sensor element according to an eleventh exemplary embodiment.

FIGS. 7a and 7b show further possible embodiments of the first coating 11. The first coating 11 comprises a plurality of quantum dots 30, which have a first and a second region made of an n-type or p-type semiconductor material, wherein the two regions are separated from one another by a p-n junction 31. Insulating regions 32, which are formed from an insulating material, e.g., quartz or quartz glass, are arranged between the individual quantum dots 30. The quantum dots 30 are covered by a top layer 33 made of a metal, for example, palladium or platinum. As in the previously described exemplary embodiments, the first coating 11 is arranged on an underlying second coating 12 made of a transparent, electrically-conductive oxide. In the present exemplary embodiment, this second coating 12 is applied to a transparent glass substrate 34.

FIG. 7b shows a modification of the exemplary embodiment shown in FIG. 7a, which is substantially similar. In contrast to the embodiment shown in FIG. 7a, however, the top layer 34 made of metal is additionally textured or structured, which exerts a reinforcing effect on the Raman scattering by metal hydride or hydrogen molecular bonds present on the surface. This effect is also known as SERS (surface enhanced Raman scattering). In the present exemplary embodiment, it can be used to achieve an increased sensitivity of the Raman measurement.

Figure 8:
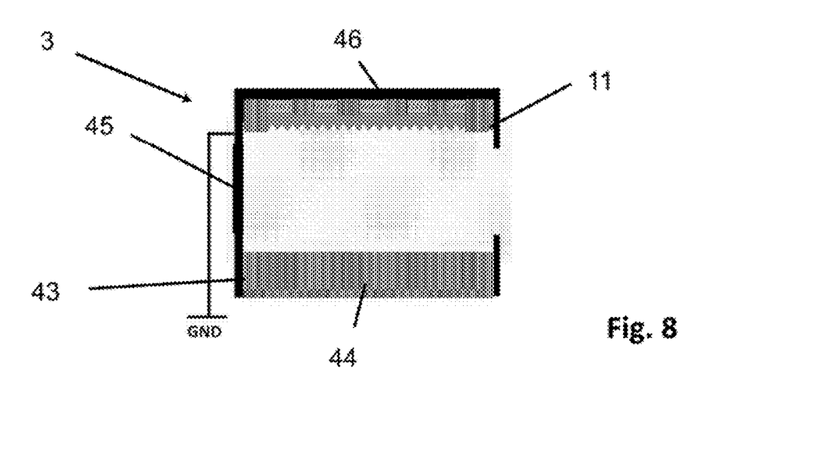
FIG. 8 shows a schematic longitudinal section view of a front end region, intended for media contact, of the sensor according to a second exemplary embodiment.

FIG. 8 shows a sensor element 3 according to a second exemplary embodiment. The sensor element 3 has a wall 43, e.g., made of stainless steel, which can be connected to the probe body (for example, the probe body 1 shown in FIG. 1). The wall 43 forms a cylindrical base body, which can be screwed to the probe body, for example. At its end facing the probe body, the base body is closed in a liquid-tight manner by a window 44 formed of a material transparent to the radiation of the radiation source 4 and made, for example, of glass or quartz glass. From the base body, a web 45 projects, at the end of which is arranged, opposite the window 44, a carrier 46, which can also be formed from stainless steel. Arranged on the carrier 46 is a coating system which is identical to the coating system of the first coating 11 and the second coating 12 according to the exemplary embodiment shown in FIG. 7b. A top layer 34, facing the window 44, of the coating system is formed of palladium and has a textured surface in order to produce an amplification of a Raman spectrum detected on the surface.

The invention claimed is:
1. A sensor for measuring a pH value of a measuring liquid, the senor comprising:
a sensor element, which includes a first surface adapted to contact the measuring liquid;
at least one radiation source configured to emit electromagnetic transmission radiation incident on the sensor element, wherein at least a portion of the transmission radiation is converted into measurement radiation in a region of the first surface by reflection and/or scattering;
at least one radiation receiver configured to receive the measurement radiation and convert the measurement radiation into electrical signals; and
a measuring circuit connected to the radiation receiver, the measuring circuit configured to determine a measured value representing the pH value of the measuring liquid based on the electrical signals of the radiation receiver,
wherein the sensor element is configured such that a wavelength of at least a portion of the transmission radiation generates charge carriers in at least one surface region or a near-surface region of the first surface adapted to contact the measuring liquid to effect a photoelectrochemical reaction with formation of hydrogen in the measuring liquid adjacent the first surface adapted to contact the measuring liquid.

2. The sensor of claim 1, wherein the surface region comprises a metal or a metal alloy that binds atomic hydrogen and/or molecular hydrogen to form a metal hydride.

3. The sensor of claim 2, wherein the metal or metal alloy comprises at least one element of the group 8-10 (VIIIB) or the group 11 (IB) of the periodic table of the elements.

4. The sensor of claim 2, wherein:
the sensor element comprises a first layer, comprising the metal or the metal alloy, and a second layer disposed directly adjacent the first layer;
the first layer defines the first surface adapted to contact the measuring liquid; and
the second layer comprises a first semiconductor material.

5. The sensor of claim 4, wherein the semiconductor material is a metal oxide selected from $d^0$-metal oxides, $d^{10}$-metal oxides, complex metal oxides, perovskites, silicon oxide, germanium oxide, and III/IV or II/VI semiconductors, either intrinsically or doped.

6. The sensor of claim 4, wherein the first semiconductor material includes a doping, and wherein the sensor element further comprises a third layer formed of a doped second semiconductor material disposed between the first layer and the second layer such that a p-n junction is formed between the second layer and the third layer.

7. The sensor of claim 4, wherein the first semiconductor material includes a doping, and wherein the sensor element further comprises a third layer formed of a doped second semiconductor material disposed on a side of the second layer, the side facing away from the first layer, such that a p-n junction is formed between the second layer and the third layer.

8. The sensor of claim 7, wherein the first semiconductor material and the second semiconductor material are the same type of semiconductor material but with different doping.

9. The sensor of claim 2, wherein the sensor element comprises a plurality of semiconductor nanoparticles, which are doped and form quantum dots, and wherein the semiconductor nanoparticles are at least partially surrounded by the metal or the metal alloy.

10. The sensor of claim 9, wherein the plurality of semiconductor nanoparticles each form a core of a core-shell structure that includes a shell, wherein the shell comprises the metal or the metal alloy.

11. The sensor of claim 10, wherein the plurality of semiconductor nanoparticles are configured as nanorods, each including a first end and a second end opposite the first end,
wherein a portion of the nanorods comprising the first end is enveloped by a first layer comprising the metal or metal alloy, and the second end is covered by a second layer comprising a doped semiconductor material such that a p-n junction is formed between the second end of the nanorods and the second layer.

12. The sensor of claim 2, wherein the sensor element comprises at least first semiconductor nanostructures and second semiconductor nanostructures, each of which is at least partially covered by a layer comprising the metal or metal alloy such that the layer defines the first surface adapted to contact the measuring liquid, and
wherein the first semiconductor nanostructures have a different geometry and/or chemical composition and a different bandgap than the second semiconductor nanostructures.

13. The sensor of claim 12, wherein the at least one radiation source is configured to emit transmission radiation of different wavelengths, and
wherein the at least one radiation source is further configured to emit transmission radiation of:
a first wavelength selected to excite the first semiconductor nanostructures as to generating free charge carriers, and
a second wavelength different from the first wavelength and selected to excite the second semiconductor nanostructures as to generate free charge carriers.

14. The sensor of claim 2, wherein the sensor element comprises a first layer, comprising the metal or the metal alloy, and a second layer disposed directly adjacent the first layer,
wherein the second layer includes individual regions, comprising at least one doped semiconductor material, which are electrically insulated from each other by intervening regions comprising an electrically-insulating material.

15. The sensor of claim 14, wherein the individual regions of the second layer each comprise a first partial layer, directly adjoining the first layer and comprising a first doped semiconductor material, and a second partial layer, comprising a second doped semiconductor and disposed on a side of the first partial layer, which side faces away from the first layer, such that a p-n junction is formed between the first partial layer and the second partial layer.

16. The sensor of claim 2, wherein the sensor element includes a top first layer, comprising the metal or the metal alloy, and a coating which is disposed below the first layer and is transparent at least to a portion of the transmission radiation and/or at least to a portion of the measurement radiation, wherein the transparent coating comprises an electrically-conductive material.

17. The sensor of claim 16, wherein the transparent coating comprises a transparent and conductive oxide.

18. The sensor of claim 16, further comprising:
an auxiliary electrode adapted to contact the measuring liquid; and
a voltage source configured to apply a voltage between the transparent coating and the auxiliary electrode.

19. The sensor of claim 2, wherein the sensor element comprises a top first layer of the metal or the metal alloy, and a second layer disposed directly below the first layer, wherein the second layer comprises a material switchable between a state transparent to the transmission radiation and a state reflective to the transmission radiation.

20. The sensor of claim 1, wherein the sensor element in the surface region includes a photosensitizer operative for formation of electron hole pairs in semiconductor materials, the band gaps of which are too large for direct excitation with the transmission radiation.

21. The sensor of claim 20, wherein the photosensitizer is selected from metal porphyrins, metal phthalocyanines, BODIPY, thiazines, phenazines, xanthenes, acridines and triphenylmethyl compounds.

22. The sensor of claim 1, wherein the at least one radiation receiver is configured to receive as the measurement radiation at least a portion of the transmission radiation reflected and/or scattered in the region of the first surface at the first surface and to convert such measurement radiation into the electrical signals.

23. The sensor of claim 1, wherein the at least one radiation receiver is configured to receive transmission radiation converted by Raman scattering in the region of the first surface as measurement radiation and to convert such measurement radiation into the electrical signals.

* * * * *